United States Patent
Kerestecioglu et al.

(10) Patent No.: US 9,028,792 B2
(45) Date of Patent: May 12, 2015

(54) PROCESS AND APPARATUS FOR TREATING A SULPHUR-CONTAINING OFF-GAS FROM A SULPHUR RECOVERY SYSTEM

(71) Applicant: Linde Aktiengesellschaft, Munich (DE)

(72) Inventors: Ulvi Kerestecioglu, Geltendorf (DE); Alexander Brandl, Munich (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/284,442

(22) Filed: May 22, 2014

(65) Prior Publication Data

US 2014/0348741 A1 Nov. 27, 2014

(30) Foreign Application Priority Data

May 23, 2013 (DE) .................... 10 2013 008 852

(51) Int. Cl.
*C01B 17/04* (2006.01)
*C01B 17/05* (2006.01)
(Continued)

(52) U.S. Cl.
CPC ............ *C01B 17/05* (2013.01); *B01D 53/1418* (2013.01); *B01D 53/1462* (2013.01); *C01B 3/52* (2013.01); *C01B 17/04* (2013.01); *C10K 1/08* (2013.01); *B01D 2252/2021* (2013.01); *B01D 2256/16* (2013.01); *B01D 2256/20* (2013.01); *C10K 1/004* (2013.01); *C10K 1/005* (2013.01); *C10K 1/14* (2013.01); *C01B 2203/0415* (2013.01); *C01B 2203/0475* (2013.01); *C01B 2203/0485* (2013.01)

(58) Field of Classification Search
CPC C01B 17/0456; C01B 17/0473; C01B 17/04; C01B 17/0404; C01B 17/05; B01D 53/75; B01D 53/76; B01D 53/78; B01D 53/8618
See application file for complete search history.

(56) References Cited

U.S. PATENT DOCUMENTS 4,150,104 A * 4/1979 Herpers et al. ............. 423/574.1
4,425,317 A 1/1984 Zeller et al.

FOREIGN PATENT DOCUMENTS

| EP | 0054772 A1 | 6/1982 |
| EP | 0455285 | 10/1993 |
| EP | 0546527 | 5/1996 |

OTHER PUBLICATIONS

EP Search Report in parallel EP Application 14001736.9. Dated Oct. 29, 2014.

(Continued)

*Primary Examiner* — Timothy Vanoy
(74) *Attorney, Agent, or Firm* — Millen, White, Zelano, Branigan, P.C.

(57) ABSTRACT

The invention relates to a process and apparatus for recovering sulfur (9). In a sour gas scrubbing apparatus (S) comprises a scrubbing part (SP) and a regeneration part (RP), wherein sulfur components and carbon dioxide are selectively removed from a crude synthesis gas (2) with the aid of a circulating scrubbing agent (3). A sulfur-containing gas fraction (8) produced during the regeneration of loaded scrubbing agent is supplied to a sulfur recovery system (SR) in which an off-gas (10) comprising carbon dioxide and also sulfur components is formed. The off-gas is hydrogenated (H) and subsequently subjected to a gas scrubbing operation (Z). The hydrogenated off-gas (12) is scrubbed, independently of the crude synthesis gas (2), and scrubbing agent (13) removed from the scrubbing agent circuit of the sour gas scrubbing apparatus (S) is used to scrub out sulfur components from the hydrogenated off-gas (12).

19 Claims, 1 Drawing Sheet

(51) Int. Cl.
*B01D 53/75* (2006.01)
*B01D 53/76* (2006.01)
*B01D 53/78* (2006.01)
*B01D 53/86* (2006.01)
*B01D 53/14* (2006.01)
*C01B 3/52* (2006.01)
*C10K 1/08* (2006.01)
*C10K 1/00* (2006.01)
*C10K 1/14* (2006.01)

(56) References Cited

OTHER PUBLICATIONS

English Translation of EP 455285. Publication Date: Oct. 27, 1993. (Thomson Innovation).

English Translation of EP 546527. Publication Date: May 1, 1996. (Thomson Innovation).

\* cited by examiner

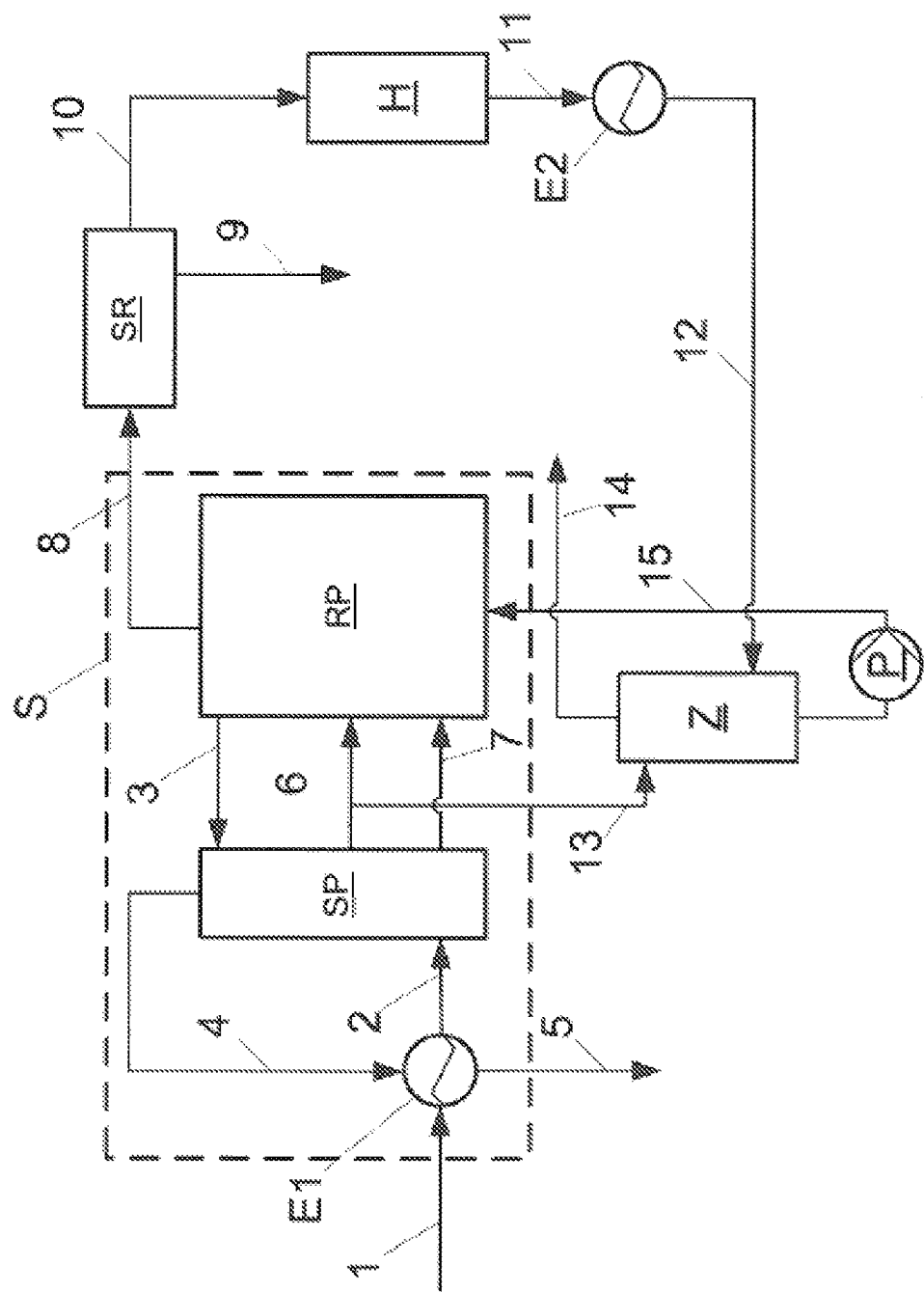

PROCESS AND APPARATUS FOR TREATING A SULPHUR-CONTAINING OFF-GAS FROM A SULPHUR RECOVERY SYSTEM

FIELD OF THE INVENTION

The invention relates to a process for recovering sulfur, wherein, in a sour gas scrubbing apparatus comprising a scrubbing part and a regeneration part, sulfur components and carbon dioxide are selectively removed from a crude synthesis gas with the aid of a circulating scrubbing agent and a sulfur-containing gas fraction produced during the regeneration of loaded scrubbing agent is supplied to a sulfur recovery system in which an off-gas comprising carbon dioxide and also sulfur components is formed which is hydrogenated and subsequently subjected to a gas scrubbing operation.

The invention further relates to an apparatus for carrying out the process.

Hydrogenation of the off-gas should, in this connection, be understood to mean that the sulfur dioxide comprised in the off-gas is hydrogenated to form hydrogen sulfide.

A process of the type described is known, for example, from patent specification EP 0054772 B1 (U.S. Pat. No. 4,425,317). In that process, the hydrogenated off-gas is recycled into the sour gas scrubbing apparatus and either subjected to a gas scrubbing operation together with the crude synthesis gas or introduced into the hydrogen sulfide enrichment stage of the regeneration part of the sour gas scrubbing apparatus. This process allows practically complete recovery, in elemental form, of the sulfur present in the crude synthesis gas. However, since the sulfur-containing off-gas arrives at the sulfur recovery system at a pressure generally too low to offset the pressure losses arising on the way to the introduction point into the sour gas scrubbing apparatus and to compensate for the higher operating pressure normally prevailing at the introduction point, the required compression of the off-gas incurs significant operating costs which negatively affect the economy of the process. Furthermore, the need to configure for higher throughput at least some of the parts of the synthesis gas scrubbing plant designed as pressure vessels leads to increased capital costs.

It is accordingly an object of the invention to specify a process of the type described above and also an apparatus for carrying out the same, allowing sulfur recovery to be carried out more economically than is possible according to the prior art.

Upon further study of the specification and appended claims, other objects, aspects and advantages of the invention will become apparent.

SUMMARY OF THE INVENTION

In process terms, these objects are achieved according to the invention by the hydrogenated off-gas being scrubbed independently of the crude synthesis gas to be treated, wherein scrubbing agent removed from the scrubbing agent circuit of the sour gas scrubbing operation is used to scrub out sulfur components.

The process according to the invention allows the scrubbing of the hydrogenated off-gas (off-gas scrubbing operation) to be carried out at a pressure substantially lower than the operating pressure of the sour gas scrubbing apparatus which, at a suitable introduction point according to the prior art, is generally greater than 2 bar(a) (e.g., 30-80 bar(a) such as in typical methanol scrubbers). In particular, it is possible to establish a pressure gradient between the off-gas source and the off-gas scrubbing operation which is sufficient to carry the off-gas from the sulfur recovery system to the off-gas scrubbing operation without compressing it. Although, compared to the prior art, additional plant parts do need to be provided, these can be realized at comparatively low cost owing to their low operating pressure. It is preferable to carry out the off-gas scrubbing operation at a pressure of between 0.2 and 5 bar(a).

The scrubbing agent loaded with sulfur components during the off-gas scrubbing operation is sensibly passed into the regeneration part of the sour gas scrubbing apparatus in order to be regenerated there.

In a preferred embodiment of the process according to the invention, the off-gas scrubbing operation is carried out using a scrubbing agent which has been preloaded with carbon dioxide during the scrubbing of crude synthesis gas, but is practically free of sulfur components. This allows a substantially selective removal of the sulfur components from the hydrogenated off-gas and therefore virtually all of the carbon dioxide present in the off-gas remains in the gas phase and can be subsequently disposed of by, for example, releasing it into the atmosphere.

In order to produce the sulfur components-containing off-gas with a sufficiently high pressure gradient with respect to the off-gas scrubbing operation, it may be necessary to operate the sulfur recovery system at elevated pressure. To this end, it is proposed that the operating pressure in the regeneration part of the sour gas scrubbing apparatus be raised to a value above that actually required, therefore allowing the sulfur-rich gas fraction to be obtained and supplied to the sulfur recovery system under elevated pressure. This typically requires elevating only the operating pressure of the thermal regeneration column in which the sulfur-rich gas fraction accumulates. Normally, dispensing with compressing the off-gas compensates for the costs resulting from this mode of operation when the operating pressure in the regeneration part needs to be raised by no more than 1 bar.

The process according to the invention can be carried out in conjunction with all known physical and chemical sour gas scrubbing apparatus. However, it is preferable for the sour gas scrubbing apparatus to be a methanol scrubbing apparatus in which methanol is used as the scrubbing agent.

The invention further relates to an apparatus for recovering sulfur, having a sour gas scrubbing apparatus which comprises a scrubbing part and a regeneration part and in which sulfur components and carbon dioxide can be selectively removed from a crude synthesis gas with the aid of a circulating scrubbing agent, having a sulfur recovery system to which a sulfur-containing gas fraction accumulating in the regeneration part of the sour gas scrubbing apparatus can be supplied and from which an off-gas comprising carbon dioxide and also sulfur components can be withdrawn and also having a hydrogenating apparatus in which the off-gas can be hydrogenated.

In apparatus terms, the stated object is achieved according to the invention in that it comprises a scrubbing apparatus which is connected both to the hydrogenating apparatus and to the scrubbing agent circuit of the sour gas scrubbing apparatus and in which the hydrogenated off-gas can be subjected to a scrubbing operation with scrubbing agent supplied from the scrubbing agent circuit of the sour gas scrubbing apparatus.

The scrubbing apparatus is advantageously also connected to the regeneration part of the sour gas scrubbing apparatus so that scrubbing agent loaded with sulfur components during the off-gas scrubbing operation can be introduced to the regeneration part for regeneration.

In preferred embodiments of the apparatus according to the invention, the scrubbing apparatus is designed as a column having structured packing and/or trays or as a spray nozzle scrubbing apparatus or eddy current wet separator or Venturi scrubbing apparatus or falling-film absorber and configured for an operating pressure of between 0.2 and 5 bar(a).

BRIEF DESCRIPTION OF THE DRAWINGS

The process and apparatus according to the invention for treating a sulfur-containing off-gas from a sulfur recovery system and further advantageous embodiments of the same will be described in more detail hereinafter with reference to the exemplary embodiment schematically illustrated in FIG. 1.

FIG. 1 shows the process scheme for a preferred variant of the process according to the invention.

In the working example illustrated, a crude synthesis gas consisting predominantly of hydrogen, carbon monoxide, carbon dioxide and hydrogen sulfide arrives at the sour gas scrubbing apparatus S, which is for example a methanol scrubbing apparatus, via line 1 and heat exchanger E1. The sour gas scrubbing apparatus S comprises a scrubbing part SP and a regeneration part RP with a scrubbing agent circulating between them in a circuit. In the scrubbing part SP, carbon dioxide and hydrogen sulfide are substantially selectively removed from the crude synthesis gas 2, said crude synthesis gas 2 having been cooled down in heat exchanger E1, with the aid of a scrubbing agent 3 and at a pressure of up to 80 bar to form a synthesis gas 4 consisting virtually entirely of hydrogen and carbon monoxide, a scrubbing agent stream 6 loaded only with carbon dioxide, and also a scrubbing agent stream 7 loaded with carbon dioxide and hydrogen sulfide. While the synthesis gas 4, after being warmed against the crude synthesis gas 1 to be cooled, is supplied to an application beyond the plant boundaries via line 5, the two loaded scrubbing agent streams 6 and 7 are introduced into the regeneration part RP in order to be regenerated there.

During regeneration, the substances absorbed by the scrubbing agent in the scrubbing part are removed, to form regenerated scrubbing agent 3 and also, inter alia, a hydrogen sulfide-rich gas phase 8. The hydrogen sulfide-rich gas phase 8 is passed from the regeneration part RP to the sulfur recovery system SR in order to recover the contained sulfur in elemental form 9. The simultaneously produced off-gas 10 consisting predominantly of carbon dioxide and sulfur dioxide is produced at a pressure sufficient to introduce it, via the hydrogenating apparatus H and without intermediate compression, into the scrubbing apparatus Z which is operated at a pressure of between 0.2 and 5 bar(a). The sulfur dioxide present in the off-gas 10 is hydrogenated in the hydrogenating apparatus H to form hydrogen sulfide thus forming a hydrogenated off-gas 11 with the result that a gas stream 12 substantially composed of carbon dioxide and hydrogen sulfide can, after removal of water (not shown) and cooling down in heat exchanger E2, be supplied to the scrubbing apparatus Z.

A scrubbing agent preloaded with carbon dioxide is supplied from the scrubbing agent circuit of the sour gas scrubbing apparatus S via line 13 and can be used to substantially selectively remove the hydrogen sulfide from the gas 12, therefore forming a stream 14 composed predominantly of carbon dioxide, and also a scrubbing agent stream 15 loaded with hydrogen sulfide and carbon dioxide. While the carbon dioxide 14 is, for example, disposed of into the atmosphere, the scrubbing agent stream 15 arrives, with the aid of pump P, at the regeneration part RP of the sour gas scrubbing apparatus, where it is regenerated. While in the Figure line 13 is shown as being branched-off from line 6, depending on the conditions in the sour gas scrubbing apparatus S line 13 may alternatively be branched-off from line 7.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 10 2013 008 852.6, filed May 23, 2013, are incorporated by reference herein.

The invention claimed is:

1. A process for recovering sulfur (9), comprising:
   selectively removing sulfur components and carbon dioxide from a crude synthesis gas (2) in a sour gas scrubbing apparatus (S), comprising a scrubbing part (SP) and a regeneration part (RP), with the aid of a circulating scrubbing agent (3), and
   supplying a sulfur-containing gas fraction (8) produced during the regeneration of loaded scrubbing agent to a sulfur recovery system (SR) in which an off-gas (10) comprising carbon dioxide and also sulfur components is formed, hydrogenated (H) to produce a hydrogenated off-gas (12), and
   subsequently subjecting said hydrogenated off-gas (12) to a gas scrubbing operation (Z),
   wherein the scrubbing of said hydrogenated off-gas (12) in said gas scrubbing operation (Z) conducted independently of the scrubbing of the crude synthesis gas (2) in said a sour gas scrubbing apparatus (S), and scrubbing agent (13) removed from the sour gas scrubbing apparatus (S) is used to scrub out sulfur components of said hydrogenated off-gas (12).

2. The process according to claim 1, wherein scrubbing agent (15) loaded with sulfur components during scrubbing of said hydrogenated off-gas (12) is passed into said regeneration part (RP) of said sour gas scrubbing apparatus (S).

3. The process according to claim 1, wherein the scrubbing of the hydrogenated off-gas (12) is carried out using a scrubbing agent (13) removed from the sour gas scrubbing apparatus (S) which has been preloaded with carbon dioxide during the scrubbing of the crude synthesis gas (2).

4. The process according to claim 2, wherein the scrubbing of the hydrogenated off-gas (12) is carried out using a scrubbing agent (13) removed from the sour gas scrubbing apparatus (S) which has been preloaded with carbon dioxide during the scrubbing of the crude synthesis gas (2).

5. The process according to claim 1, wherein the scrubbing of the hydrogenated off-gas (12) is carried out at a pressure of between 0.2 and 5 bar(a).

6. The process according to claim 2, wherein the scrubbing of the hydrogenated off-gas (12) is carried out at a pressure of between 0.2 and 5 bar(a).

7. The process according to claim 3, wherein the scrubbing of the hydrogenated off-gas (12) is carried out at a pressure of between 0.2 and 5 bar(a).

8. The process according to claim 4, wherein the scrubbing of the hydrogenated off-gas (12) is carried out at a pressure of between 0.2 and 5 bar(a).

9. The process according to claim 1, wherein the regeneration part (RP) of the sour gas scrubbing apparatus (S) is operated under elevated pressure.

10. The process according to claim 1, wherein methanol is used as the scrubbing agent (3) in the sour gas scrubbing apparatus (S).

11. An apparatus for recovering sulfur (9), comprising:
- a sour gas scrubbing apparatus (S), which comprises a scrubbing part (SP), a regeneration part (RP), and a scrubbing agent circuit, in which sulfur components and carbon dioxide can be selectively removed from a crude synthesis gas (2) with the aid of a circulating scrubbing agent (3),
- a sulfur recovery system (SR) to which a sulfur-containing gas fraction (8) accumulating in the regeneration part (RP) of the sour gas scrubbing apparatus (S) can be supplied and from which an off-gas (10) comprising carbon dioxide and also sulfur components can be withdrawn,
- a hydrogenating apparatus (H) in which the off-gas (10) can be hydrogenated, and
- a scrubbing apparatus (Z) which is connected to both the hydrogenating apparatus (H) and the scrubbing agent circuit of the sour gas scrubbing apparatus (S) and in which hydrogenated off-gas (12) from said hydrogenating apparatus (H) can be subjected to a scrubbing operation with a scrubbing agent (13) supplied from said scrubbing agent circuit of the sour gas scrubbing apparatus (S).

12. The apparatus according to claim 11, wherein the scrubbing apparatus (Z) is connected to the regeneration part (RP) of the sour gas scrubbing apparatus (S) in such a way that scrubbing agent (15) loaded in said scrubbing apparatus (Z) can be introduced into said regeneration part (RP).

13. The apparatus according to claim 11, wherein the scrubbing apparatus (Z) is designed as
   a column having structured packing and/or trays,
   a spray nozzle scrubbing apparatus,
   an eddy current wet separator,
   a Venturi scrubbing apparatus, or
   a falling-film absorber.

14. The apparatus according to claim 11, wherein the scrubbing apparatus (Z) is configured for an operating pressure of between 0.2 and 5 bar(a).

15. The apparatus according to claim 13, wherein the scrubbing apparatus (Z) is designed as a column having structured packing and/or trays.

16. The apparatus according to claim 13, wherein the scrubbing apparatus (Z) is designed as a spray nozzle scrubbing apparatus.

17. The apparatus according to claim 13, wherein the scrubbing apparatus (Z) is designed as an eddy current wet separator.

18. The apparatus according to claim 13, wherein the scrubbing apparatus (Z) is designed as a Venturi scrubbing apparatus.

19. The apparatus according to claim 13, wherein the scrubbing apparatus (Z) is designed as a falling-film absorber.

* * * * *